United States Patent
Moroishi et al.

(10) Patent No.: US 7,385,007 B2
(45) Date of Patent: Jun. 10, 2008

(54) PRESSURE SENSITIVE ADHESIVE COMPOSITION FOR OPTICAL MEMBERS, PRESSURE SENSITIVE ADHESIVE LAYER FOR OPTICAL MEMBERS, PRESSURE SENSITIVE ADHESIVE OPTICAL MEMBER AND IMAGE DISPLAY

(75) Inventors: Yutaka Moroishi, Ibaraki (JP); Fumiko Nakano, Ibaraki (JP); Tetsuo Inoue, Ibaraki (JP); Yoshihide Kawaguchi, Ibaraki (JP); Kohei Yano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 342 days.

(21) Appl. No.: 10/913,992

(22) Filed: Aug. 6, 2004

(65) Prior Publication Data

US 2005/0014879 A1    Jan. 20, 2005

(30) Foreign Application Priority Data

Oct. 2, 2003    (JP) .............................. 2003-344506

(51) Int. Cl.
*C09J 133/00* (2006.01)
*C09J 133/02* (2006.01)
*C09J 133/08* (2006.01)
*C09J 133/10* (2006.01)
*C09J 11/08* (2006.01)

(52) U.S. Cl. ...................... 525/192; 525/221; 525/228; 525/329.7; 525/330.3

(58) Field of Classification Search ................ 525/198, 525/192, 221, 228, 329.7, 330.3
See application file for complete search history.

(56) References Cited

U.S. PATENT DOCUMENTS 6,451,156 B2 * 9/2002 Kishioka et al. ............ 156/329

FOREIGN PATENT DOCUMENTS

| EP | 555959 A1 * | 8/1993 |
|---|---|---|
| JP | 10-279907 | 10/1998 |
| JP | 11-209708 | 8/1999 |
| JP | 2000-24613 | 1/2000 |
| JP | 2000-84531 | 3/2000 |
| JP | 2000-109771 | 4/2000 |
| JP | 2000109771 A * | 4/2000 |
| JP | 2000-189939 | 7/2000 |
| JP | 2001-89731 | 4/2001 |
| JP | 2001089731 A * | 4/2001 |
| JP | 2001-328849 | 11/2001 |
| JP | 2001-335767 | 12/2001 |
| JP | 2002-121521 | 4/2002 |
| JP | 2002-159955 | 6/2002 |

* cited by examiner

*Primary Examiner*—Kelechi C. Egwim
(74) *Attorney, Agent, or Firm*—Knobbe Martens Olson & Bear LLP

(57) ABSTRACT

The present invention provides a pressure sensitive adhesive composition for optical members, which is excellent in durability, re-releasability and stress relaxation, as well as a pressure sensitive adhesive composition for optical members, which hardly increases adhesion after storage for a long time and does not leave a residual adhesive on glass upon disposal or repair. The pressure sensitive adhesive composition for optical members according to the present invention comprises 100 parts by weight of an acrylic polymer (A) having a weight-average molecular weight of 500,000 or more, containing at least 50 wt % alkyl (meth) acrylate having an alkyl group with 5 or more carbon atoms and 0.2 to 2 wt % unsaturated carboxylic acid as the monomer unit, 0.1 to 4 parts by weight of an acrylic polymer (B) having a weight-average molecular weight of 2,000 to 50,000, containing at least 70 wt % alkyl(meth)acrylate and 1 to 7 wt % unsaturated carboxylic acid as the monomer unit and having a higher carboxylic acid equivalent than that of the acrylic polymer (A), 0.01 to 1 part by weight of a silane coupling agent, and a crosslinking agent.

5 Claims, No Drawings

PRESSURE SENSITIVE ADHESIVE COMPOSITION FOR OPTICAL MEMBERS, PRESSURE SENSITIVE ADHESIVE LAYER FOR OPTICAL MEMBERS, PRESSURE SENSITIVE ADHESIVE OPTICAL MEMBER AND IMAGE DISPLAY

TECHNICAL FIELD

The present invention relates to a pressure sensitive adhesive composition for optical members. The present invention also relates to a pressure sensitive adhesive layer for optical members, which is formed from the pressure sensitive adhesive composition for optical members. Further, the present invention relates to a pressure sensitive adhesive optical member having the pressure sensitive adhesive layer and also to an image display such as a liquid crystal display, an organic EL display and PDP, using the pressure sensitive adhesive optical member. The optical member includes a polarizing plate, a retardation plate, an optical compensating film, a brightness enhancement film, and a laminate thereof.

BACKGROUND ART

Optical members used in liquid crystal displays, for example a polarizing plate and a retardation plate, are attached via a pressure sensitive adhesive to liquid crystal cells. Materials used in such optical members expand and contract significantly under heating conditions and moistening conditions so that under such conditions, dry spots and lifting easily occur after attachment. Accordingly, the pressure sensitive adhesive for optical members is required to be durable even under heating conditions and moistening conditions.

When an attachment surface upon attaching an optical member is bitten with foreign matter, or an optical member is out of position because of erroneous attachment, the optical member is released for reutilization from a liquid crystal cell. When the optical member is released from the crystal cell, the re-releasability of the pressure sensitive adhesive to easily release the optical member is required so as to prevent a gap of the liquid crystal cell from being changed or the liquid crystal cell from being broken. However, when techniques of merely improving the adhesion state of the optical member are adopted for the reason the durability of the pressure sensitive adhesive for optical members is regarded as important, the pressure sensitive adhesive is rendered inferior in re-releasability.

Further, the pressure sensitive adhesive for optical member is required to uniformly relax stress caused by a dimensional change in optical members such as a polarizing plate under heating or moistening conditions. When the pressure sensitive adhesive is inferior in relaxation of stress, residual stress remains in the optical members such as a polarizing plate, to bring about adverse influences such as discoloration and coloring failure in some cases.

Various kinds of materials are proposed as the pressure sensitive adhesive used in optical members. For example, it is attempted to improve the stress relaxation of the pressure sensitive adhesive by blending a low-molecular weight polymer with a high-molecular weight polymer (see JP-A 10-279907, JP-A 2000-109771, JP-A 2000-89731, JP-A 2001-335767, and JP-A 2002-121521).

JP-A 10-279907 proposes a pressure sensitive adhesive composition having a crosslinked structure formed by blending 20 to 200 parts by weight of a low-molecular weight polymer having a weight-average molecular weight of 30,000 or less with 100 parts by weight of a high-molecular weight polymer having a high functional group proportion. It is disclosed therein that a three-dimensional structure of the high-molecular weight component in the pressure sensitive adhesive composition prevents foaming and peeling under high temperature and high humidity, and internal stress caused by a dimensional change in a polarizing plate can be absorbed by the low-molecular weight polymer component.

JP-A 2000-109771 proposes a pressure sensitive adhesive composition comprising a high-molecular weight polymer blended with a low-molecular weight polymer having a weight-average molecular weight of 500,000 or less. It is disclosed therein that the pressure sensitive adhesive composition can relax stress concentration to prevent coloring failure and discoloration of a liquid crystal cell, and after released, does not permit any residual adhesive or fogging on the liquid crystal cell.

JP-A 2000-89731 proposes a pressure sensitive adhesive composition comprising 1 to 50 parts by weight of a low-molecular weight polymer having a weight-average molecular weight of not less than 5,000 and less than 500,000 blended with 100 parts by weight of a high-molecular weight polymer, wherein either of the high-molecular weight polymer or the low-molecular weight polymer contains nitrogen-containing functional groups. It is disclosed therein that the pressure sensitive adhesive composition is excellent in durability due to binding of the nitrogen-containing functional groups to an adherent, and prevents coloring failure by coping with expansion and contraction of a polarizing plate.

JP-A 2001-335767 proposes a pressure sensitive adhesive composition comprising 5 to 100 parts by weight of an acrylic oligomer having a weight-average molecular weight of 1,000 to 10,000 and a bifunctional crosslinking agent blended with 100 parts by weight of a high-molecular weight polymer. It is disclosed therein that the pressure sensitive adhesive composition is excellent in adhesion to an adherent and possesses excellent relaxation of stress, to attain durability and prevent coloring failure.

JP-A 2002-121521 proposes a pressure sensitive adhesive composition comprising 10 to 100 parts by weight of a low-molecular weight polymer having a glass transition point of 0 to −80° C. and a weight-average molecular weight of 30,000 to 100,000 and a multifunctional compound blended with 100 parts by weight of a high-molecular weight polymer. It is disclosed therein that the pressure sensitive adhesive composition can cope with peeling, foaming and coloring failure phenomenon, and is excellent in reworkability (re-releasability) concerned with the degree of difficulty in releasing a polarizing film from a liquid crystal cell and in re-attaching it.

Any of the above pressure sensitive adhesive compositions comprising a low-molecular weight polymer blended with a high-molecular weight polymer are excellent in durability and absorb internal stress by the low-molecular weight component. However, it cannot be said that any of the above pressure sensitive adhesive compositions sufficiently satisfy durability, re-releasability and stress relaxation. Particularly, the pressure sensitive adhesive compositions are poor in the ability to re-release optical members in order to re-utilize liquid crystal cells. In evaluation of reworkability (re-releasability) in JP-A 2002-121521, reworkability are assumed to be excellent when a pressure sensitive adhesive polarizing film previously attached to a glass plate, treated in an autoclave and left at 23° C. under 65% RH for 24 hours shows an adhesion of not higher than 1200 g/25 mm (about 12 N/25 mm) upon peeling at 180°. According to this standard of reworkability, the reworkability of a larger crystal cell as an evaluation sample (sample width: 250 mm) are assumed to be excellent when the adhesion thereof upon peeling is not higher than 12 kg/250 mm. Under this standard, however, the gap of such a larger liquid crystal cell is often broken.

On the other hand, liquid crystal displays come to be used in personal computers and TV sets, and large liquid crystal displays are recently usable, and the number of large liquid crystal displays is rapidly increasing. At present, waste materials from the liquid crystal displays are not so much, but it is estimated that the waste materials are rapidly increased in near future, and the amount of the waste materials is estimated to reach about 100,000 tons annually. Waste materials from TFT liquid crystal panels, for example, are composed of 85 wt % glass and 15 wt % polarizing film (resin). The glass is milled and used as e.g. glass cullets for building materials, but the amount of such reused glass is not so great at present. This is because isolation of glass is difficult. Accordingly, there is demand for techniques of separating glass from other components. Methods of recycling used liquid crystal displays are disclosed (see JP-A 2000-24613, JP-A 2000-189939 and JP-A 2000-84531), but these methods involve heating the liquid crystal displays at high temperatures where enormous energy is required, thus bringing about a problem of higher costs. In addition, methods of fractionating and recovering materials constituting liquid crystal displays to recycle them are also disclosed (JP-A 2002-159955 and JP-A 2001-328849). However, methods using special devices or leading to generation of waste alkali solutions are hardly generally utilizable because of problems in costs and waste liquor treatment. An antireflection film provided with an adhesive, which upon disposal, is readily releasable is disclosed (JP-A 11-209708).

An object of the present invention is to provide a pressure sensitive adhesive composition for optical members, which is excellent in durability, re-releasability and stress relaxation. Another object of the present invention is to provide a pressure sensitive adhesive composition for optical members, which hardly increases adhesion after storage for a long time and does not leave a residual adhesive on glass upon disposal or repair. A further object of the present invention is to provide a pressure sensitive adhesive layer for optical members, which is formed from the pressure sensitive adhesive composition for optical members. A still further object of the present invention is to provide a pressure sensitive adhesive optical member having the pressure sensitive adhesive layer, as well as an image display using the pressure sensitive adhesive optical member.

DISCLOSURE OF THE INVENTION

The present inventors made extensive study for achieving the objects described above, and as a result they found that the following pressure sensitive adhesive composition for optical members can achieve the objects, and the present invention was thereby completed.

That is, the present invention relates to a pressure sensitive adhesive composition for optical members, comprising:

100 parts by weight of an acrylic polymer (A) having a weight-average molecular weight of 500,000 or more, containing at least 50 wt % alkyl(meth)acrylate having an alkyl group with 5 or more carbon atoms and 0.2 to 2 wt % unsaturated carboxylic acid as the monomer unit, 0.1 to 4 parts by weight of an acrylic polymer (B) having a weight-average molecular weight of 2,000 to 50,000, containing at least 70 wt % alkyl(meth)acrylate and 1 to 7 wt % unsaturated carboxylic acid as the monomer unit and having a higher carboxylic acid equivalent than that of the acrylic polymer (A), 0.01 to 1 part by weight of a silane coupling agent, and a crosslinking agent.

In the pressure sensitive adhesive composition for optical members, the acrylic polymer (B) is contained in an amount of preferably 0.1 to 2 parts by weight, more preferably 0.2 to 1 part by weight, relative to 100 parts by weight of the acrylic polymer (A).

In the pressure sensitive adhesive composition for optical members, the acrylic polymer (A) preferably contains a hydroxyl group-containing monomer as the monomer unit.

In the pressure sensitive adhesive composition for optical members, the crosslinking agent is contained in an amount of preferably 0.01 to 5 parts by weight relative to 100 parts by weight of the acrylic polymer (A).

Further, the present invention relates to a pressure sensitive adhesive layer for optical members, which is formed by crosslinking the above-described pressure sensitive adhesive composition for optical members.

In the crosslinked pressure sensitive adhesive layer for optical members, the gel fraction is preferably 35 to 90% by weight.

Furthermore, the present invention relates to pressure sensitive adhesive optical members comprising the above-described pressure sensitive adhesive layer formed on one side or both sides of optical members.

Finally, the present invention relates to an image display using at least one of the above-described pressure sensitive adhesive optical members.

EFFECT OF THE INVENTION

The pressure sensitive adhesive composition for optical members according to the present invention comprises a high-molecular weight acrylic polymer (A) containing a specific amount of a monomer unit of unsaturated carboxylic acid, a low-molecular weight acrylic polymer (B) containing a monomer unit of unsaturated carboxylic acid in a larger amount than in the high-molecular weight acrylic polymer (A), a small amount of a silane coupling agent, and a crosslinking agent. A pressure sensitive adhesive layer formed from the pressure sensitive adhesive composition hardly increases its adhesion to a liquid crystal cell, owing to the effect of the low-molecular weight acrylic polymer (B). Accordingly, the pressure sensitive adhesive layer is excellent in re-releasability, and even if a long time has elapsed in various steps after attachment of an optical member to a liquid crystal cell and the optical member is stored under high-temperature and high-humidity conditions, the optical member can be easily released from the liquid crystal cell without damaging or polluting the liquid crystal cell. That is, when the optical member is erroneously attached to the liquid crystal cell, or when the liquid crystal cell is disposed or repaired, the optical member can be easily released from the liquid crystal cell without any remaining adhesive. Upon attachment to a larger liquid crystal cell, the optical member is also excellent in re-releasability and can be reutilized without damaging the liquid crystal cell. The above effect is significant when the acrylic polymer (B) is added in an amount of 0.1 to 2 parts by weight, particularly 0.2 to 1 part by weight, relative to 100 parts by weight of the acrylic polymer (A).

The detailed reason for the effect of the low-molecular weight acrylic polymer (B) on prevention of increased adhesion to a liquid crystal cell is not revealed, but it is estimated that the low-molecular weight acrylic polymer (B) can, due to its low molecular weight, occur and move in a crosslinked structure of the high-molecular weight acrylic polymer (A) and is more hydrophilic than the high-molecular weight acrylic polymer (A), and can thus move to the interface between the liquid crystal cell and the adhesive, to prevent adhesion from increasing. Further, the low-molecular weight acrylic polymer (B) is effective in a very small amount of 0.1 to 4 parts by weight relative to 100 parts by weight of the high-molecular weight acrylic polymer (A), and thus phenomena such as surface pollution are not recognized at all. As a matter of course, the effect of the composition as a whole including the silane coupling agent and the crosslinking agent is also brought about.

The pressure sensitive adhesive layer formed from the pressure sensitive adhesive composition of the present invention can be established so as to have a predetermined gel fraction by the crosslinking agent, and even if a long time has elapsed in various steps after attachment of an optical member to a liquid crystal cell and the optical member is stored under high-temperature and high-humidity conditions, the pressure sensitive adhesive composition in an adhesion state is excellent in durability without peeling, dry spots or foaming. Further, the high-molecular weight acrylic polymer (A) is based on the acrylate having an alkyl group with 5 or more carbon atoms, and is excellent in relaxation of stress caused by a dimensional change in optical members such as a polarizing plate, thus remaining residual stress in a polarizing plate etc. to prevent discoloration and coloring failure.

BEST MODE FOR CARRYING OUT THE INVENTION

The high-molecular weight acrylic polymer (A) of the present invention contains at least 50 wt % alkyl(meth) acrylate having an alkyl group with 5 or more carbon atoms and 0.2 to 2 wt % unsaturated carboxylic acid as the monomer unit. In the present invention, the alkyl(meth) acrylate refers to alkyl acrylate and/or alkyl methacrylate. The term "(meth)" is used in this meaning in this specification.

The alkyl group in the alkyl(meth)acrylate is not particularly limited insofar as it is an alkyl group containing 5 or more carbon atoms, but the number of carbon atoms in the alkyl group is preferably 16 or less, more preferably 5 to 16, still more preferably 6 to 10, from the viewpoint of lower glass transition point and modulus of elasticity. The alkyl group containing 5 or more carbon atoms may be a linear or branched chain, but is preferably a branched chain for lower glass transition point.

The alkyl(meth)acrylate containing 5 or more carbon atoms includes, for example, isoamyl(meth)acrylate, 2-ethylhexyl(meth)acrylate, isooctyl(meth)acrylate, isononyl (meth)acrylate, isomyristyl(meth)acrylate etc. These may be used singly or as a mixture of two or more thereof.

The acrylic polymer (A) contains at least 50 wt % alkyl(meth)acrylate having an alkyl group containing 5 or more carbon atoms as the monomer unit. The content of the alkyl(meth)acrylate is preferably 60 to 90 wt %. It is not preferable that the content of the alkyl(meth)acrylate is less than 50% by weight, because stress relaxation is insufficient.

The unsaturated carboxylic acid includes acrylic acid, methacrylic acid, itaconic acid, maleic acid etc. An anhydride thereof can also be used. Among these compounds, acrylic acid and methacrylic acid are preferably used.

The acrylic polymer (A) contains 0.2 to 2 wt %, preferably 0.3 to 1.5 wt % unsaturated carboxylic acid as the monomer unit. A content outside of this range is not preferable because when the content of the unsaturated carboxylic acid is higher than 2 wt %, the adhesion of the resulting composition to a liquid crystal cell is too high, while when the content is less than 0.2 wt %, durability is adversely affected.

The acrylic polymer (A) may contain other monomers insofar as the alkyl(meth)acrylate having an alkyl group with 5 or more carbon atoms and the unsaturated carboxylic acid are contained in the above ratios as the monomer unit. The other monomers include an alkyl(meth)acrylate having a $C_1$ to $C_4$ alkyl group, such as methyl(meth)acrylate, ethyl (meth)acrylate and butyl(meth)acrylate; a hydroxyl group-containing monomer such as 2-hydroxyethyl(meth)acrylate, 2-hydroxypropyl(meth)acrylate, hydroxybutyl(meth)acrylate, hydroxyhexyl(meth)acrylate and N-methylol (meth) acrylamide; an epoxy group-containing monomer such as glycidyl(meth)acrylate; and a nitrogen-containing monomer such as (meth)acrylamide, N,N-dimethyl(meth)acrylamide, N,N-diethyl(meth)acrylamide, (meth)acryloylmorpholine, (meth)acetonitrile, vinylpyrrolidone, N-cyclohexylmaleimide, itaconimide and N,N-dimethylaminoethyl(meth)acrylamide. Further, vinyl acetate, styrene etc. can also be used. These monomers can be used singly or as a mixture of two or more thereof.

The other monomers are preferably those having a functional group reactive with a crosslinking agent. Particularly, a hydroxyl group-containing monomer is preferable. The content of the monomer having a functional group reactive with a crosslinking agent is preferably 0.02 to 1 wt %. The content is more preferably 0.04 to 0.4 wt %.

The weight-average molecular weight (determined by GPC; any molecular weights shown below were also determined by GPC) of the acrylic polymer (A) is 500,000 or more. The weight-average molecular weight is preferably 600,000 or more. When the weight-average molecular weight is less than 500,000, durability is insufficient. On the other hand, the weight-average molecular weight of the acrylic polymer (A) is preferably 1,500,000 or less, more preferably 1,200,000 or less, from the viewpoint of operativeness.

In production of the acrylic polymer (A), a known radical polymerization method such as solution polymerization, bulk polymerization and emulsion polymerization can be suitably selected. As the radical polymerization initiator, a wide variety of known azo- or peroxide-based polymerization initiators can be used. For example, a solution polymerization initiator such as azobisisobutyronitrile is used in an amount of about 0.01 to 0.2 part by weight relative to 100 parts by weight of the total monomers. As the polymerization solvent, a solvent such as ethyl acetate or toluene is used. The reaction is carried out usually at about 50 to 70° C. for about 8 to 15 hours in an inert gas stream such as nitrogen.

The acrylic polymer (B) comprises at least 70 wt % alkyl(meth)acrylate and 1 to 7 wt % unsaturated carboxylic acid as the monomer unit and having a higher carboxylic acid equivalent than that of the acrylic polymer (A).

The number of carbon atoms in the alkyl group in the alkyl(meth)acrylate is not particularly limited, but is preferably 1 to 4, from the viewpoint of hydrophilicity and flexibility. The alkyl(meth)acrylate having a $C_1$ to $C_4$ alkyl group includes, for example, methyl(meth)acrylate, ethyl (meth)acrylate, butyl(meth)acrylate etc. The alkyl(meth) acrylate having a $C_1$ to $C_4$ alkyl group is used in an amount of preferably 50 wt % or more, more preferably 60 wt % or more. These may be used singly or as a mixture of two or more thereof.

The acrylic polymer (B) contains at least 70 wt % of the alkyl(meth)acrylate as the monomer unit. The content of the alkyl(meth)acrylate is preferably 80 to 96 wt %. It is not preferable that the content of the alkyl(meth)acrylate is less than 70 wt %, because hydrophilicity is insufficient.

The unsaturated carboxylic acid can be exemplified by those illustrated in the acrylic polymer (A). The acrylic polymer (B) contains the unsaturated carboxylic acid in an amount of 1 to 7 wt %, preferably 2 to 6 wt %, as the monomer unit. It is not preferable that the content of the unsaturated carboxylic acid is higher than 7 wt %, because stress relaxation is lowered. A content of less than 1 wt % is not preferable either because adhesion to a liquid crystal cell is increased.

The content of the unsaturated carboxylic acid is regulated such that the carboxylic acid equivalent of the acrylic polymer (B) is higher than the carboxylic acid equivalent of the acrylic polymer (A). It is not preferable for the carboxylic acid equivalent of the acrylic polymer (B) to be lower than the carboxylic acid equivalent of the acrylic polymer (A), because adhesion to a liquid crystal cell is increased. The carboxylic acid equivalent is the amount of carboxylic acid group per 1 g of the polymer, and for example, in the case of carboxylic acid derived from acrylic acid, the carboxylic acid equivalent (equivalent/g) is calculated by dividing, with the molecular weight of acrylic acid, the weight of acrylic acid in 1 g of the polymer.

The acrylic polymer (B) can contain other monomers insofar as it contains the alkyl(meth)acrylate and the unsaturated carboxylic acid as the monomer unit in the above ratios. The other monomers can be exemplified by those illustrated in the acrylic polymer (A).

The weight-average molecular weight of the acrylic polymer (B) is 2,000 to 50,000, preferably 5,000 to 40,000. When the weight-average molecular weight is less than 2,000, durability is deteriorated. On the other hand, it is not preferable for the weight-average molecular weight of the acrylic polymer (B) to be higher than 50,000, because adhesion to a liquid crystal cell is increased.

The acrylic polymer (B) can be produced in the same manner as in production of the acrylic polymer (A). The weight-average molecular weight can be regulated by using a large amount of a polymerization initiator or by using a chain transfer agent such as mercaptan.

As the silane coupling agent, a conventionally known one can be used without particular limitation. Examples include an epoxy group-containing silane coupling agents such as 3-glycidoxypropyltrimethoxysilane, 3-glycidoxypropylmethyldiethoxysilane and 2-(3,4-epoxycyclohexyl)ethyltrimethoxysilane; an amino group-containing silane coupling agents such as 3-aminopropyltrimethoxysilane, N-2-(aminoethyl)-3-aminopropylmethyldimethoxysilane and 3-triethoxysilyl-N-(1,3-dimethylbutylidene)propylamine; a (meth)acryl group-containing silane coupling agents such as 3-acryloxypropyltrimethoxysilane and 3-methacryloxypropyltriethoxysilane; and an isocyanate group-containing silane coupling agents such as 3-isocyanatopropyltriethoxysilane.

The crosslinking agent is a multifunctional compound, which can react with carboxylic acid groups in the acrylic polymer (A), further with other functional groups, to form a crosslinked structure. When hydroxyl groups are introduced as functional groups, the crosslinking agent forms a crosslinked structure with the hydroxyl groups. The crosslinking agent includes, for example, tolylene diisocyanate, diphenyl methane diisocyanate, polyisocyanate compounds such as various polyols having diisocyanate compounds added thereto, epoxy compounds, aziridine compounds, melamine compounds, metal salts, and metal chelate compounds. Among these compounds, the polyisocyanate compounds are preferably used. Particularly, it is preferable that when the acrylic polymer (A) is produced, hydroxy-containing monomers such as 2-hydroxyethyl acrylate are copolymerized, and when hydroxyl groups are introduced into the acrylic polymer (A), a crosslinked structure of the acrylic polymer (A) is formed by using a polyisocyanate compound as a crosslinked agent.

The pressure sensitive adhesive composition for optical members according to the present invention comprises the high-molecular weight acrylic polymer (A), the low-molecular weight acrylic polymer (B), a silane coupling agent and a crosslinking agent. The amount of the acrylic polymer (B) to be blended is 0.1 to 4 parts by weight, preferably 0.1 to 2 parts by weight, relative to 100 parts by weight of the acrylic polymer (A). An amount outside of this range is not preferable because when the acrylic polymer (B) is blended in an amount of higher than 4 parts by weight, durability is adversely affected, while when the amount is less than 0.1 part by weight, the adhesion to a liquid crystal cell is increased. In consideration of peeling properties after storage for a long time, the amount of the acrylic polymer (B) to be blended is particularly preferably 0.2 to 1 part by weight relative to 100 parts by weight of the acrylic polymer (A). When the amount of the acrylic polymer (B) to be blended is higher than 1 part by weight, the adhesion tends to be slightly increased after storage for a long time. When the amount is less than 0.2 part by weight, it tends to be difficult to prevent the adhesion from increasing after storage for a long time.

The silane coupling agent is incorporated in an amount of 0.01 to 1 part by weight, preferably 0.02 to 0.6 part by weight, relative to 100 parts by weight of the acrylic polymer (A). A content outside this range is not preferable because when the content of the silane coupling agent is higher than 1 part by weight, the adhesion of the resulting composition to a liquid crystal cell is increased, while when the content is less than 0.01 part by weight, durability is deteriorated.

The amount of the crosslinking agent to be incorporated is not particularly limited, but preferably the crosslinking agent is incorporated such that the gel fraction of the resulting crosslinked pressure sensitive adhesive layer is 35 to 90 wt %. The amount the crosslinking agent to be incorporated is regulated more preferably such that the gel fraction is 40 to 80 wt %. When the gel fraction is low, durability tends to be insufficient, while when the gel fraction is high, stress relaxation tends to be insufficient. For regulation of gel fraction, the amount of the crosslinking agent to be incorporated into 100 parts by weight of the acrylic polymer (A) is usually 0.01 to 5 parts by weight, more preferably 0.02 to 2 parts by weight, depending on the material to be used.

The gel fraction of the pressure sensitive adhesive layer is calculated from the following equation:

$$\text{Gel fraction (wt\%)} = (W2/W1) \times 100$$

wherein W1 is the dry weight (g) of a pressure sensitive adhesive layer, and W2 is the weight (g) of the pressure sensitive adhesive layer which was dipped in ethyl acetate at room temperature (23° C.) for 7 days, then removed and dried.

Specifically, the gel fraction is determined in the following manner. That is, a solution of the pressure sensitive adhesive composition is applied onto a film subjected to release treatment, then dried at 110° C. for 5 minutes and aged at 50° C. for 24 hours, and a predetermined amount (about 500 mg) W1 (g) of the resulting adhesive is collected. Then, this adhesive is left in ethyl acetate for 7 days at room temperature, and then the gel is removed and dried at 130° C. for 2 hours to measure the weight W2 (g) of the gel. The gel fraction is determined by using the determined weight (W1 and W2) in the above formula.

The pressure sensitive adhesive composition for optical members according to the present invention can blended if necessary with an UV absorber, aging inhibitor, softener, dye, pigment, filler etc.

The pressure sensitive adhesive optical member of the present invention is obtained by forming a pressure sensitive adhesive layer of the pressure sensitive adhesive composition for optical members, on one side or both sides of an optical member.

The method of forming the pressure sensitive adhesive layer on an optical member includes, but is not limited to, a method wherein the pressure sensitive adhesive composition is applied onto a release liner, then dried and crosslinked to form a pressure sensitive adhesive layer which is then transferred onto an optical member, and a method wherein the pressure sensitive adhesive composition is applied directly onto an optical member, dried and crosslinked to form a pressure sensitive adhesive layer. For application, any arbitrary coating methods using a roll coater such as a reverse coater or a gravure coater, a curtain coater, a lip coater or a die coater can be used. The thickness of the pressure sensitive adhesive layer after drying is usually 2 to 500 μm, preferably 5 to 100 μm.

When the pressure sensitive adhesive layer is exposed to the surface of a support material or the like, the pressure sensitive adhesive layer is protected until use with a sheet subjected to release treatment. The material constituting the release sheet includes paper, a film of synthetic resin such as polyethylene, polypropylene or polyethylene terephthalate, rubber sheet, paper, cloth, nonwoven fabric, net, foamed sheet and metal foil, as well as a suitable film such as a laminate thereof. The surface of the release sheet may be subjected to release treatment such as silicone treatment, long-chain alkyl treatment or fluorine treatment in order to improve releasability from the pressure sensitive adhesive layer, if necessary.

As optical members, members used for formation of image displays, such as liquid crystal displays, may be used, and kinds are not especially limited. For example, polarizing plates may be mentioned as optical members. As polarizing plates, in general a polarizing plate having transparent protective film one side or both sides of a polarizer is used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the protective film prepared on one side or both sides of the polarizer, materials is excellent in transparency, mechanical strength, heat stability, water shielding property, isotropy, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 500 μm or less, preferably 1 through 300 μm, and especially preferably 5 through 300 μm in viewpoint of strength, work handling and thin layer Moreover, it is preferable that the protective film may have as little coloring as possible. Accordingly, a protective film having a phase difference value in a film thickness direction represented by Rth=[(nx+ny)/2−nz]×d of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a phase difference value (Rth) of −90 nm through +75 nm in a thickness direction. The phase difference value (Rth) in a thickness direction is preferably −80 nm through +60 nm, and especially preferably −70 nm through +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

An optical member of the present invention is especially no limitation about the optical layers, which may be used for formation of a liquid crystal display etc., such as a reflector, a transflective plate, a retardation plate (a half wavelength plate and a quarter wavelength plate included), and a viewing angle compensation film, may be used.

Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called ¼ plate) is used. Usually, half-wavelength plate (also called ½ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

As retardation plates, birefringent films obtained by uniaxially or biaxially stretched polymer materials, oriented films of liquid crystal polymers, oriented layers of liquid crystal polymers currently supported with films may be mentioned. A thickness of the retardation plate is also not especially limited, and it is about 20 to 150 µm in general.

As polymer material, for example, there may be mentioned: polyvinyl alcohols, polyvinyl butyrals, polymethyl vinyl ethers, polyhydroxy ethyl acrylates, hydroxyethyl celluloses, hydroxy propyl celluloses, methyl celluloses, polycarbonates, polyallylates, polysulfones, polyethylene terephthalates, polyethylene naphthalates, polyethersulfones, polyphenylene sulfides, polyphenylene oxides, polyallyl sulfones, polyamides, polyimides, polyolefins, polyvinyl chlorides, cellulose type polymers, and norbornene based resins, or binary or ternary copolymers, graft copolymers, and blend object thereof. These polymer materials are stretched to obtain an oriented object that is stretched film.

As liquid crystalline polymers, for example, various kinds of polymers of principal chain type and side chain type in which conjugated linear atomic groups (mesogens) conferring liquid crystalline orientation are introduced into a principal chain and a side chain of a polymer may be mentioned. As examples of principal chain type liquid crystalline polymers, polymers having a structure where mesogen groups are bonded by spacer parts conferring flexibility, for example, polyester based liquid crystalline polymers having nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain skeleton, and having mesogen parts comprising para-substituted cyclic compound units conferring nematic orientation property as side chains via spacer parts comprising conjugated atomic groups may be mentioned. These liquid crystal polymer, for example, is aligned by developing a solution of a liquid crystal polymer on an orientation treated surface where rubbing treatment was performed to a surface of thin films, such as polyimide and polyvinyl alcohol, formed on a glass plate, or where silicon oxide is deposited by an oblique evaporation method, and then by heat-treating. Retardation plates that have suitable phase difference depending on the purpose of use, such as aiming at compensation of coloring or viewing angle using birefringence, for example, various wavelength plates and liquid crystal layers, may be used. In addition retardation plates in which two or more kinds of retardation plates are laminated together to control optical properties, such as phase difference may be used.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical member, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a bi-directional stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two or more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively. Although an optical member with the above described optical layer laminated to the polarizing plate may be formed by a method in which laminating is separately carried out sequentially in manufacturing process of a liquid crystal display etc., an optical member in a form of being laminated beforehand has an outstanding advantage that it has excellent stability in quality and assembly workability, etc., and thus manufacturing processes ability of a liquid crystal display etc. may be raised. Proper adhesion means, such as a pressure sensitive adhesive layer, may be used for laminating. On the occasion of adhesion of the above described polarizing plate and other optical members, the optical axis may be set as a suitable configuration angle according to the target retardation characteristics etc.

In addition, in the present invention, ultraviolet absorbing property may be given to the above-mentioned each layer, such as a pressure sensitive adhesive optical member, an optical member etc. and an pressure sensitive adhesive layer, using a method of adding UV absorbents, such as salicylic acid ester type compounds, benzophenol type compounds, benzotriazol type compounds, cyano acrylate type compounds, and nickel complex salt type compounds.

A pressure sensitive adhesive optical member of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical members and, if necessity, lighting system, and by incorporating driving circuit. In the present invention, except that an optical member by the present invention is used, there is especially no limitation to use any conventional methods. Also any liquid crystal cell of arbitrary type, such as TN type, and STN type, π type may be used. And above-mentioned IPS type, VA type may be used.

Suitable liquid crystal displays, such as liquid crystal display with which the above-mentioned pressure sensitive adhesive optical member has been located at one side or both sides of the liquid crystal cell, and with which a backlight or a reflector is used for a lighting system may be manufactured. In this case, the pressure sensitive adhesive optical member by the present invention may be installed in one side or both sides of the liquid crystal cell. When installing the optical members in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., an emitting layer comprising fluorescent organic solids, such as anthracene; a laminated material of electronic injection layer comprising such an emitting layer and perylene derivatives, etc.; laminated material of these hole injection layers, emitting layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, a very thin film about 10 nm forms an organic emitting layer in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Hereinafter, the present invention is described in more detail by reference to the Examples, but the present invention is not limited by the Examples. In the Examples, "parts" and "%" refer to "parts by weight" and "% by weight", respectively.

Example 1

Preparation of High-molecular Weight Acrylic Polymer (A)

70 parts of isononyl acrylate, 20 parts of butyl acrylate, 10 parts of ethyl acrylate, 1 part of acrylic acid, 0.1 part of 2-hydroxyethyl acrylate, 0.1 part of 2,2'-azobisisobutyronitrile and 200 parts of ethyl acetate were introduced into a four-necked flask equipped with a nitrogen inlet tube and a condenser, then flushed sufficiently with nitrogen, and subjected to polymerization reaction at 55° C. for 12 hours under stirring in a nitrogen stream to give a solution of acrylic polymer (A1) having a weight-average molecular weight of 850,000. The carboxylic acid equivalent of the acrylic polymer (A1) was $1.37 \times 10^{-4}$ equivalent/g.

Preparation of Low-molecular Weight Acrylic Polymer (B)

80 parts of butyl acrylate, 15 parts of 2-ethylhexyl acrylate, 5 parts of acrylic acid, 0.8 part of lauryl mercaptan and 0.1 part of 2,2'-azobisisobutyronitrile were introduced into a four-necked flask equipped with a nitrogen inlet tube and a condenser, then flushed sufficiently with nitrogen, and subjected to polymerization reaction at 55° C. for 12 hours under stirring in a nitrogen stream to give a solution of acrylic polymer (B1) having a weight-average molecular weight of 27,000. The carboxylic acid equivalent of the acrylic polymer (B1) was $6.89 \times 10^{-4}$ equivalent/g.

Preparation of a Pressure Sensitive Adhesive Composition for Optical Members 0.5 part (solids content) of the acrylic polymer (B1) solution, 0.1 part of 3-glycidoxypropyltrimethoxysilane as a silane coupling agent, and 0.8 part of a polyisocyanate-based crosslinking agent consisting of tolylene diisocyanate-added trimethylol propane as a crosslinking agent were uniformly mixed with 100 parts (solids content) of the acrylic polymer (A1) solution to prepare a pressure sensitive adhesive composition for optical members.

Formation of a Pressure Sensitive Adhesive Optical Member

The pressure sensitive adhesive composition was applied onto a polyethylene terephthalate film of 38 μm in thickness subjected to silicone release treatment, such that the thickness of its pressure sensitive adhesive layer after drying was 25 μm, followed by drying and crosslinking at 110° C. for 5 minutes to form a pressure sensitive adhesive layer. The pressure sensitive adhesive layer was transferred onto a polarizing plate and subjected to aging treatment at 50° C. for 24 hours, to give a pressure sensitive adhesive optical member. The gel fraction of the pressure sensitive adhesive layer was 45%.

Example 2

A pressure sensitive adhesive composition for optical members was formed in the same manner as in Example 1 except that the amount (solids content) of the acrylic polymer (B1) solution to be used was changed to 0.2 part. Further, a pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 48%.

Example 3

A pressure sensitive adhesive composition for optical members was formed in the same manner as in Example 1 except that the amount (solids content) of the acrylic polymer (B1) solution to be used was changed to 0.8 part. Further, a pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 43%.

Example 4

A pressure sensitive adhesive composition for optical members was formed in the same manner as in Example 1 except that 0.02 part of an epoxy-based crosslinking agent (1,3-bis(N,N-diglycidylaminoethyl)cyclohexane) was used as the crosslinking agent. Further, a pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 62%.

Example 5

Preparation of High-molecular Weight Acrylic Polymer (A)

70 parts of 2-ethylhexyl acrylate, 30 parts of butyl acrylate, 0.5 part of acrylic acid, 0.1 part of 2-hydroxyethyl acrylate, 0.1 part of 2,2'-azobisisobutyronitrile and 200 parts of ethyl acetate were introduced into a four-necked flask equipped with a nitrogen inlet tube and a condenser, then flushed sufficiently with nitrogen, and subjected to polymerization reaction at 55° C. for 12 hours under stirring in a nitrogen stream to give a solution of acrylic polymer (A2) having a weight-average molecular weight of 950,000. The carboxylic acid equivalent of the acrylic polymer (A2) was $0.69 \times 10^{-4}$ equivalent/g.

Preparation of Low-molecular Weight Acrylic Polymer (B)

100 parts of butyl acrylate, 5 parts of acrylic acid, 1 part of lauryl mercaptan and 0.1 part of 2,2'-azobisisobutyronitrile were introduced into a four-necked flask equipped with a nitrogen inlet tube and a condenser, then flushed sufficiently with nitrogen, and subjected to polymerization reaction at 55° C. for 12 hours under stirring in a nitrogen stream to give a solution of acrylic polymer (B2) having a weight-average molecular weight of 21,000. The carboxylic acid equivalent of the acrylic polymer (B2) was $6.55 \times 10^{-4}$ equivalent/g.

Preparation of a Pressure Sensitive Adhesive Composition for Optical Members 0.5 part (solids content) of the acrylic polymer (B2) solution, 0.1 part of 3-acryloxypropyltrimethoxysilane as a silane coupling agent, and 1 part of a polyisocyanate-based crosslinking agent consisting of tolylene diisocyanate-added trimethylol propane as a crosslinking agent were uniformly mixed with 100 parts (solids content) of the high-molecular weight polymer (A2) solution to prepare a pressure sensitive adhesive composition for optical members.

Formation of a Pressure Sensitive Adhesive Optical Member

The pressure sensitive adhesive composition was applied onto a polyethylene terephthalate film of 38 μm in thickness subjected to silicone release treatment, such that the thickness of its pressure sensitive adhesive layer after drying was 25 μm, followed by drying and crosslinking at 110° C. for 5 minutes to form a pressure sensitive adhesive layer. The pressure sensitive adhesive layer was transferred onto a polarizing plate and subjected to aging treatment at 50° C. for 24 hours, to give a pressure sensitive adhesive optical member. The gel fraction of the pressure sensitive adhesive layer was 58%.

Example 6

A pressure sensitive adhesive composition for optical members was formed in the same manner as in Example 1 except that the amount (solids content) of the acrylic polymer (B1) solution to be used was changed to 0.1 part. Further, a pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 60%.

Example 7

A pressure sensitive adhesive composition for optical members was formed in the same manner as in Example 1 except that the amount (solids content) of the acrylic polymer (B1) solution to be used was changed to 3 parts. Further, a pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 54%.

Comparative Example 1

A pressure sensitive adhesive composition for optical members was formed in the same manner as in Example 1 except that the acrylic polymer (B1) was not used. Further, an pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 50%.

Comparative Example 2

A pressure sensitive adhesive composition for optical members was formed in the same manner as in Example 1 except that the amount (solids content) of the acrylic polymer (B1) solution to be used was changed to 5 parts. Further, a pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 40%.

Comparative Example 3

A pressure sensitive adhesive composition for optical members was formed in the same manner as in Example 1 except that the silane coupling agent was not used. Further, a pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 45%.

Comparative Example 4

A pressure sensitive adhesive composition for optical members was formed in the same manner as in Example 1 except that the amount of 3-glycidoxypropyltrimethoxysilane to be used was changed to 3 parts. Further, a pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 47%.

Comparative Example 5

Preparation of High-molecular Weight Acrylic Polymer (A)

A solution of an acrylic polymer (A3) having a weight-average molecular weight of 850,000 was obtained in the same manner as in Example 1 except that the amount of acrylic acid to be used was changed to 5 parts. The carboxylic acid equivalent of the acrylic polymer (A3) was $6.61 \times 10^{-4}$ equivalent/g.

Preparation of Low-molecular Weight Acrylic Polymer (B)

A solution of an acrylic polymer (B3) having a weight-average molecular weight of 850,000 was obtained in the same manner as in Example 1 except that the amount of acrylic acid to be used was changed to 1 part. The carboxylic acid equivalent of the acrylic polymer (B3) was $1.45 \times 10^{-4}$ equivalent/g.

Preparation of a Pressure Sensitive Adhesive Composition for Optical Members, and Formation of a Pressure Sensitive Adhesive Optical Member A pressure sensitive adhesive composition for optical members was formed in the same manner as in Example 1 except that the acrylic polymer (A3) was used in place of the acrylic polymer (A1), and the acrylic polymer (B3) was used in place of the acrylic polymer (B1). Further, a pressure sensitive adhesive layer was formed in the same manner as in Example 1 except that the above pressure sensitive adhesive composition was used, and also a pressure sensitive adhesive optical member was obtained. The gel fraction of the pressure sensitive adhesive layer was 52%.

The pressure sensitive adhesive optical members (polarizing plates) obtained in the Examples and the Comparative Examples were evaluated as follows. The results are shown in Table 1.

Adhesion

The pressure sensitive adhesive optical member cut into a piece of 25 mm in width was attached to a non-alkali glass plate by rolling a 2 kg roll once, and then treated in an autoclave at 50° C., 0.5 MPa, for 30 minutes. Then, the sample was left under the conditions of 23° C. and 50% RH for 3 hours, and then measured for its peel adhesion (initial adhesion: N/25 mm) at a peel angle of 90° at a peel rate of 300 mm/min. On the other hand, the sample was treated in the autoclave and then left at 70° C. for 48 hours, further left at 23° C. under 50% RH for 3 hours, and measured for its peel adhesion (adhesion after treatment: N/25 mm) at a peel angle of 90° at a peel rate of 300 mm/min. The adhesion after heat treatment is desirably not increased from the initial adhesion.

Separately, the sample was treated in the autoclave, then left at 90° C. for 300 hours, left at 23° C. under 50% RH for 3 hours, and then measured for its peel adhesion (adhesion after treatment: N/25 mm) at a peel angle of 90° at a peel rate of 300 mm/min. Whether the adhesive and the optical member remained or not on the glass plate was observed with naked eyes, and evaluation was conducted under the following criteria:

◯: The pressure sensitive adhesive and the optical member did not remain at all.

x: The pressure sensitive adhesive and the optical member remained.

Durability

The pressure sensitive adhesive optical member cut in a size of 12 inches was attached to a non-alkali glass plate of 0.5 mm in thickness, treated in an autoclave at 50° C., 0.5 MPa, for 30 minutes and then introduced into an atmosphere at 60° C., 90% RH, for 500 hours. Thereafter, the pressure sensitive adhesive optical member was observed with naked eyes and evaluated under the following criteria:

◯: The optical member was not peeled and was free of dry spots.

x: The optical member was peeled and had dry spots.

Discoloration

The pressure sensitive adhesive optical members cut in a size of 12 inches were attached to both sides of a non-alkali glass plate of 0.5 mm in thickness such that the absorption axes of the polarizing plates were perpendicular to each other, and then treated in an autoclave at 50° C., 0.5 MPa, for 30 minutes, and then introduced into an atmosphere at 90° C. for 500 hours. Thereafter, the sample was examined for its discoloration with naked eyes and evaluated under the following criteria:

TABLE 1

| | Adhesion (N/25 mm) | | Left at 90° C. for 300 hours | | | |
| --- | --- | --- | --- | --- | --- | --- |
| | Initial | Treatment at 70° C. | Adhesion (N/25 mm) | Residual adhesive | Durability | Discoloration |
| Example 1 | 3.6 | 4.0 | 5.4 | ◯ | ◯ | ◯ |
| Example 2 | 3.8 | 4.4 | 7.9 | ◯ | ◯ | ◯ |
| Example 3 | 3.4 | 3.5 | 7.2 | ◯ | ◯ | ◯ |
| Example 4 | 2.9 | 3.1 | 6.5 | ◯ | ◯ | ◯ |
| Example 5 | 2.8 | 3.4 | 10.3 | ◯ | ◯ | ◯ |
| Example 6 | 5.5 | 7.5 | 11.9 | ◯ | ◯ | ◯ |
| Example 7 | 4.2 | 4.3 | 11.3 | ◯ | ◯ | ◯ |
| Comparative Example 1 | 6.6 | 10.3 | 18 | X | ◯ | ◯ |
| Comparative Example 2 | 3.5 | 3.8 | 14 | ◯ | X | ◯ |
| Comparative Example 3 | 3.7 | 4.1 | 12.5 | X | X | ◯ |
| Comparative Example 4 | 5.3 | 11.6 | 13.5 | ◯ | ◯ | ◯ |
| Comparative Example 5 | 10.4 | 18.9 | 20 | ◯ | ◯ | X |

◯: There was no discoloration.
X: There was discoloration.

In the above results, the pressure sensitive adhesive optical member of the present invention shows a small difference between the initial adhesion and the adhesion after treatment at 70° C., indicating that the adhesion is not increased after attachment to the liquid crystal cell. Accordingly, the optical member placed under any of the treatment conditions can be easily re-released with good re-releasability without any residual adhesive and without destroying the liquid crystal cell, and thus the liquid crystal cell can be reutilized. Further, the pressure sensitive adhesive optical member is durable in the sever test for a long time, is excellent in relaxation of stress caused by a dimensional change in the optical member (polarizing plate) and is free of adverse influence (discoloration) in liquid crystal display. Further, the adhesion of the pressure sensitive adhesive optical member to the glass is prevented from increasing after storage at high temperatures for a long time, and after release, no adhesive remains on the glass. Accordingly, only the glass can be easily isolated, and the recycling of the glass can be improved. On the other hand, it could be confirmed that when the pressure sensitive adhesive optical members in the Comparative Examples are attempted at satisfying durability or solve discoloration, the adhesion thereof is increased to make re-release of the optical member difficult. When the pressure sensitive adhesive optical members in the Comparative Examples are released after storage at high temperatures for a long time, the adhesive readily remains on the glass.

The invention claimed is:

1. A pressure sensitive adhesive composition for optical members, comprising:

100 parts by weight of an acrylic polymer (A) having a weight-average molecular weight of 500,000 or more, containing at least 50 wt % alkyl(meth)acrylate having an alkyl group with 5 or more carbon atoms and 0.2 to 2 wt % unsaturated carboxylic acid as the monomer unit, 0.1 to 4 parts by weight of an acrylic polymer (B) having a weight-average molecular weight of 2,000 to 50,000, containing at least 70 wt % alkyl(meth)acrylate and 1 to 7 wt % unsaturated carboxylic acid as the monomer unit and having a higher carboxylic acid equivalent than that of the acrylic polymer (A), 0.01 to 1 part by weight of a silane coupling agent, and a crosslinking agent.

2. The pressure sensitive adhesive composition for optical members according to claim 1, wherein the acrylic polymer (B) is contained in an amount of 0.1 to 2 parts by weight relative to 100 parts by weight of the acrylic polymer (A).

3. The pressure sensitive adhesive composition for optical members according to claim 1, wherein the acrylic polymer (B) is contained in an amount of 0.2 to 1 part by weight relative to 100 parts by weight of the acrylic polymer (A).

4. The pressure sensitive adhesive composition for optical members according to claim 1, wherein the acrylic polymer (A) contains a hydroxy group-containing monomer as the monomer unit.

5. The pressure sensitive adhesive composition for optical members according to claim 1, wherein the crosslinking agent is contained in an amount of 0.01 to 5 parts by weight relative to 100 parts by weight of the acrylic polymer (A).

* * * * *